UNITED STATES PATENT OFFICE.

ARTHUR LAFLAMME, OF MONTREAL, QUEBEC, CANADA, ASSIGNOR OF ONE-HALF TO ALDAMA LAFLAMME, OF MONTREAL, CANADA.

ADHESIVE COMPOSITION.

1,380,568.   Specification of Letters Patent.   Patented June 7, 1921.

No Drawing.   Application filed November 22, 1919. Serial No. 340,040.

*To all whom it may concern:*

Be it known that I, ARTHUR LAFLAMME, a British subject, residing at #80 de Grandpré street, in the city of Montreal, in the Province of Quebec, in the Dominion of Canada, have invented certain new and useful Improvements in Adhesive Compositions; and I do hereby declare that the following is a full, clear, and exact description of the same.

The present invention relates to an adhesive composition and the object of this invention is to provide a composition of this character, that will be useful in putting up wall papers, burlaps and paintings as the dampness or frost has no effect on it when applying it.

A further object is to provide a composition of this character which will not freeze in low temperatures, and furthermore will not require to be heated before it is applied.

A better comprehension of the composition will be had from the accompanying description of the composition and method of preparing.

In preparing one hundred pounds of this composition:—10 lbs. of flour are thoroughly mixed with approximately 4 gallons of hot water.

2nd. The following ingredients are mixed in the proportions as follows:—in 4 gallons of boiling water 2 ounces of caustic alkali, 1 lb. of rosin, 1 lb. of glue, ¼ lb. of sugar of lead, ¼ lb. of ammonium chlorid, 6 lbs. of plaster and whiting, 1 lb. of saltpeter.

After the above mentioned ingredients have been thoroughly dissolved and mixed and while the solution is still boiling, the flour paste composed of 10 lbs. of flour prepared with 4 gallons of water are mixed therewith and left to rest for 24 hours.

The mechanical combination of the flour paste and the other ingredients will then be obtained during the above specified period of time and the adhesive composition will be ready for use.

The most important ingredients forming part of the present composition consist of the flour paste, whiting, glue, plaster and ammonia.

In order that the composition will stand freezing temperatures, caustic and saltpeter are used.

The object of using rosin and sugar of lead, is for hardening the composition after its application.

The above described composition is particularly adapted for putting up wall papers and burlaps at any temperature above or below "0" degree Fahrenheit.

Further it can be used on wet or frozen walls and it will have the same adhesive qualities as if applied on a dry wall.

What I claim as my invention is:—

An adhesive formed of 2 ounces of caustic, 1 lb. of rosin, ¼ lb. of ammonium chlorid, ¼ lb. of sugar of lead, 1 lb. of glue, 3 lbs. of whiting, 3 lbs. of plaster, 1 lb. of saltpeter mixed in approximately 4 gallons of boiling water, to which are added 10 lbs. of flour mixed separately in approximately 4 gallons of water.

Signed at Montreal, Quebec, Canada, this 22nd day of October, 1919.

ARTHUR ╳ LAFLAMME.
his mark

Witnesses:
C. PATENAUDE,
B. WOOD.